United States Patent [19]

Vetter et al.

[11] 4,440,314

[45] Apr. 3, 1984

[54] METHOD AND APPARATUS FOR THE AUTOMATIC DYNAMIC DOSING AT LEAST OF ONE FLUID COMPONENT OF A MIXED FLUID

[76] Inventors: Kurt Vetter, Rechbergweg 24, Remseck 3, Fed. Rep. of Germany, 7148; Werner Schweiker, Fasanenweg 8, Gemmrigheim, Fed. Rep. of Germany, 7121

[21] Appl. No.: 282,564

[22] Filed: Jul. 13, 1981

Related U.S. Application Data

[63] Continuation of Ser. No. 972,373, Dec. 22, 1978, abandoned.

[30] Foreign Application Priority Data

Dec. 24, 1977 [DE] Fed. Rep. of Germany ....... 2758096

[51] Int. Cl.³ .................. B67D 5/32; B67D 5/52; G01F 5/00; G05D 11/00
[52] U.S. Cl. ........................................ 222/39; 137/99; 137/101.19; 137/101.31; 222/55; 222/61; 222/134; 222/135; 366/160
[58] Field of Search ................ 222/1, 23, 39, 40, 52, 222/55, 57, 61, 63, 134, 135; 137/3, 7, 9, 12, 87, 88, 98, 99, 100, 101.19, 101.21, 101.31; 366/152, 160, 162

[56] References Cited

U.S. PATENT DOCUMENTS

| | | | |
|---|---|---|---|
| 2,863,471 | 12/1958 | Thurman | 137/98 X |
| 2,892,619 | 6/1959 | Thurman | 366/160 X |
| 3,081,909 | 3/1963 | Hooker | 222/135 X |
| 3,232,585 | 2/1966 | Garbarino, Jr. et al. | 366/160 X |
| 3,263,932 | 8/1966 | Ruland | 222/1 X |
| 3,272,217 | 9/1966 | Young | 137/101.19 |
| 3,307,744 | 3/1967 | Burford | 222/1 |
| 3,398,689 | 8/1968 | Allington | 137/99 X |
| 3,415,264 | 12/1968 | Brown et al. | 137/101.19 X |
| 3,452,774 | 7/1969 | Stanton | 137/101.31 X |
| 3,474,815 | 10/1969 | Beahm et al. | 137/101.19 |
| 3,678,373 | 7/1972 | Riley | 137/88 X |
| 3,721,253 | 3/1973 | Remke | 137/88 X |
| 3,802,605 | 4/1974 | Standlick | 137/100 X |
| 3,817,658 | 6/1974 | Murase | 137/88 X |
| 3,843,099 | 10/1974 | Duncan | 137/88 X |
| 3,908,862 | 9/1975 | Chandra et al. | 222/134 X |
| 3,921,901 | 11/1975 | Woodman | 239/61 X |
| 3,999,686 | 12/1976 | Kato | 222/39 |
| 4,090,262 | 5/1978 | Schneider et al. | 366/162 X |
| 4,176,672 | 12/1979 | Borberg | 137/101.21 X |

Primary Examiner—Robert B. Reeves
Assistant Examiner—Edward M. Wacyra
Attorney, Agent, or Firm—Martin A. Farber

[57] ABSTRACT

In order to increase the dosing precision it is proposed to control the flow of the main component and thereby the measured flow of the main component is used as a variable desired value, and with the control of the flow of the secondary component the control value (the actual value) of the flow of the main component is used for determining or defining the desired value of the flow of the secondary component (which latter-mentioned value is proportional to this control value); as well as to use for this purpose a geared pump ($P_8$) for the feeding of the main component to a servo controlled member or system (the geared pump being arranged between a pressure vessel ($D_S$) and a measuring transducer (12)), an electrical machine $M_8$, which is operable as a motor and drives the pump ($P_8$) for the main component, which with the electrical machine $M_8$ which is associated with it forms a regulating element, an electronic four-quadrant controller (16) for the machine ($M_8$) which is coordinated to the main component and two tacho-generators ($T_8$, $T_{10}$) which are coupled with respectively each one of the two electrical machines ($M_8$, $M_{10}$). The method and apparatus are provided for the principal use with the mixing of a hardener of a two-component lacquer with its mother lacquer.

13 Claims, 1 Drawing Figure

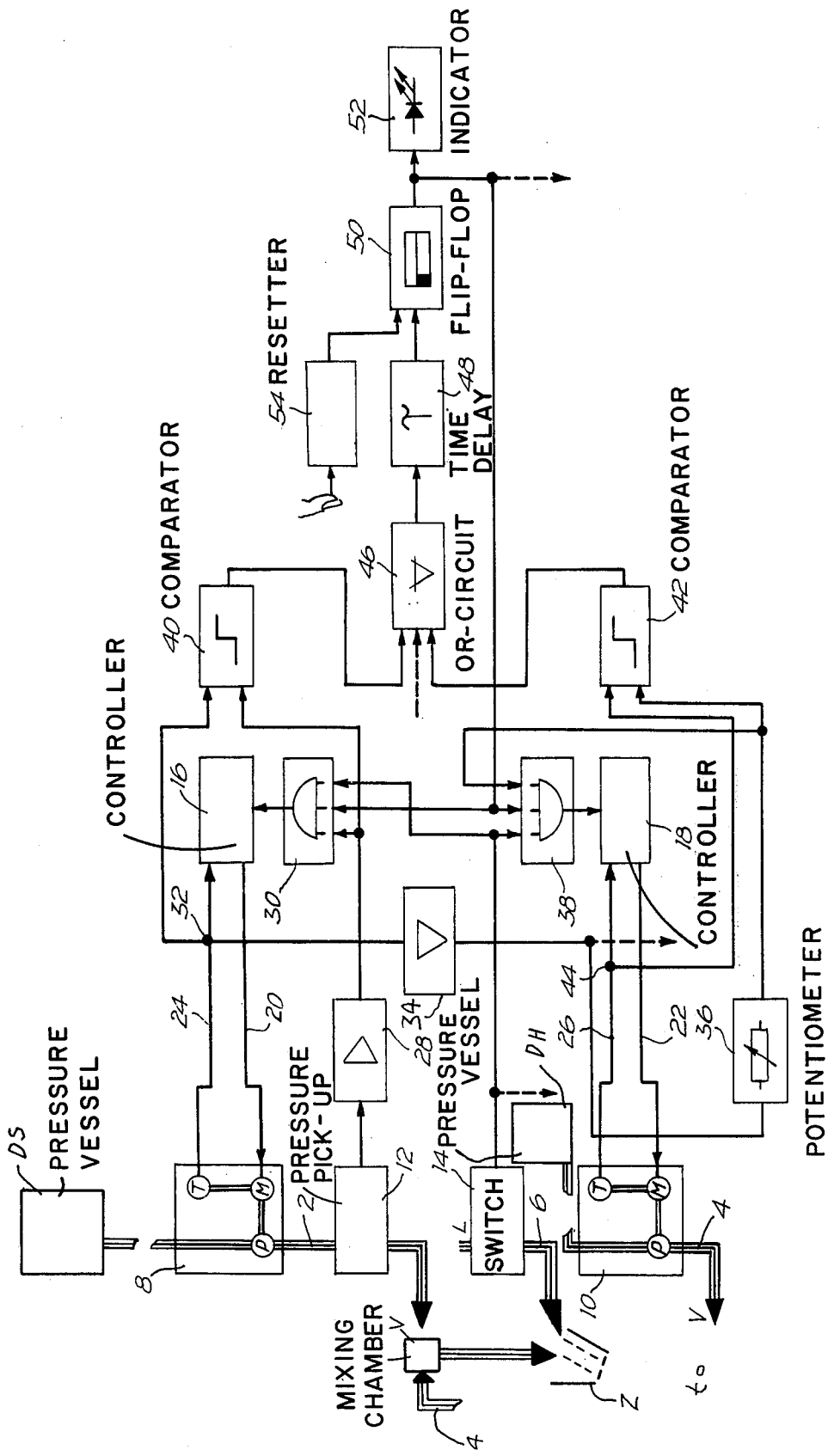

METHOD AND APPARATUS FOR THE AUTOMATIC DYNAMIC DOSING AT LEAST OF ONE FLUID COMPONENT OF A MIXED FLUID

This is a continuation of application Ser. No. 972,373, filed Dec. 22, 1978 now abandoned.

BACKGROUND OF THE INVENTION

1. Field of the Invention

The invention relates to a method for the automatic dynamic dosing at least of one liquid component of a mixed liquid, particularly of the hardener of a 2K-lacquer with mother lacquer, with which the flow of the pressure-transported main component (mother lacquer) is measured and the flow of the pressure-fed secondary component (hardener) which is to be dosed is regulated and moreover adjusted corresponding to the predetermined quantity ratio of the two components to be mixed; as well as a device for performing of such a method with each one pressure vessel containing the main component and the secondary component, respectively; with an analog measuring transducer which produces an electrical value proportional to the flow of the main component; with a geared pump for feeding of the secondary component to a servo controlled member or system; with an electrical machine, which is operatable as a motor and drives the geared pump, which pump forms a regulating element with the electrical machine; with an electronic four-quadrant controller for the electric machine; with a digital potentiometer for adjusting or controlling the quantity ratio of the main component relative to the secondary component; and with an electrical arrangement with which the measuring transducer is connected to a controller and the electrical machine for the secondary component as well as the controller therefor are arranged in an electrical automatic control circuit.

2. Description of the Prior Art

A device of this type by which the geared pump alternately or reciprocally serves for throttling of the secondary component and for this purpose the electrical machine is operatable as a generator braking the pump, and a method of the introductory type which is performable with it, are known from the editions 1976 Oberflaeche No. 6, pages 342 to 344 and JOT, June 1976, pages 19 to 21. Accordingly for "controlling" the quantity of the main component there is used a "regulating element" which should comprise the pressure vessel for the main component and the throttle in a spray gun which is connected to the device for atomization of the mixed liquid by means of compressed air. Obviously it does not deal with the control of the flow of the main component by means of a controller on an automatic control system, but rather merely to the control of the flow of the main component by means of a regulating element on a servo control member or system, whereby also the designation control chain may be used.

The known device has two continuously working measuring cells of unknown construction type; one of which constitutes a measuring transducer and the other is arranged in the control system for the secondary components downstream of the regulating member for the secondary component and the controller for the secondary component supplies the control value (actual value) of the flow of the secondary component, while the measuring transducer in connection with the potentiometer for the adjustment of the quantity ratio of the main component and the secondary component supplies to the controller for the secondary component a desired value of the flow of the secondary component, which desired value is proportional to the measured flow of the main component.

with respect to the exact maintainance of the predetermined quantity ratio of the two components which are to be mixed, the combined control and regulation of the flow of the secondary component indeed brings a better result than the pure control of the flow of the secondary component with the help of the measured flow of the main component. It is however to be determined that possible pressure oscillations in the pressure vessel for the main component as well as in the path portion between the regulating element for the secondary component and the measuring cell for the secondary component, indirectly and directly, respectively, negatively influence the precision of the dosing of the secondary component. It is consequently desireable to increase to precision of the dosing by means of completing and/or modifying measures.

The invention consequently is based on the task to provide a method of the introductory named type and to make a device of the introductory named type which is suited and determined for its performance, by which a higher dosing precision is achieved.

SUMMARY OF THE INVENTION

This task is solved according to the method of the invention in the manner that the flow of the main component is controlled and thereby the measured flow of the main component is used as a variable desired value, and that with the control of the flow of the secondary component the control value (the actual value) of the flow of the main component is used for determining or defining the desired value of the flow of the secondary component (which latter-mentioned value is proportional to this control value). By the device of the invention this is achieved by a geared pump (P8) for the feeding of the main component to a servo controlled member or system, the geared pump being arranged between the pressure vessel (Ds) and the measuring transducer (12); by an electrical machine (M8) which is operatable as a motor and drives the geared pump (P8) for the main component, which with the machine which is associated with it forms a regulating element; by an electronic four-quadrant controller (16) for the electrical machine (M8) which is coordinated to the main component and by two tacho-generators (T8, T10) which are coupled with respectively each one of the two electrical machines (M8, M10). The electrical arrangement of the device in accordance with the invention is featured correspondingly in the manner that the measurement transducer (12), under circumstances if necessary via a measuring amplifier (28), is connected to the controller (16) for the main component; that the electrical machine for the main component as well as the controller therefor are arranged in an electric automatic control system (16-20-M8-T8-24-16); that the tacho-generator (T8, T10) is connected to respectively each one of the two automatic controls (16,18) and that the tacho-generator (T8) for the main component, under circumstances if necessary via an isolation amplifier (34) or another impedance, is connected to a potentiometer (36) and the latter is connected to the automatic controller (18) for the secondary component.

Consequently two mechanical and circuitwise technically similar controls are present for the flow of the main component and the secondary component, respectively, whereby the desired value estimates on the one hand originate from the sole measuring transducer which follows the servo controlled system for the main component, and on the other hand comes primarily from the tacho-generator for the main component. As a consequence of this the predetermined ratio of the quantities of the two components to be mixed are more exactly maintained than previously, when the feeding pressure and the flow of the main component changes, particularly when this occurs quickly as at the beginning of the atomization of the mixed liquid.

With one preferred manner of performance of the method in accordance with the invention the desired value and the actual value of the flow of the main component and secondary component are compared for each component and upon exceeding at least one of the permissable control differences, the desired values for both controls are lowered to zero, in which according to one preferred embodiment of the device in accordance with the invention the measuring transducer (12) and the measuring amplifier (28), respectively, and the potentiometer are connected over respectively each one AND circuit (30,38) to the automatic controller (16 and 18 respectively), for the main component and secondary component, respectively, and directly each to the desired value input of a comparator (40 and 42, respectively), the actual value input of the latter being connected with the tacho-generator (T8 and T10, respectively) for the main component and secondary component, respectively; in which anti-valence circuit (46) is connected to the two comparators (40, 42), which anti-valence circuit controls a bi-stable multivibrator (50), the output of the latter being connected to respectively one input of the two AND-circuits (30, 38). An exclusive OR circuit (46) as the anti-valence circuit and the flip-flop circuit (50) with a manually releaseable resetting (54) as a multivibrator are preferred for this. For the purpose of this completing measure the feeding of both components is to be immediately automatically interrupted when only one of the two comparators is also adjusted and thereby permissible control deviations are exceeded. For this case with the known device only a warning indication is provided. If the anti-valence circuit does not use an exclusive OR gate, then the two comparators which connect therewith emit signals, the signs of which alternate in the same sense upon exceeding the permissible minimum control differences. So that during the transient operation in both controls even upon exceeding the minimum control differences which are allowed for the time after the transient operation, the feeding of both components is not interrupted, with a preferred manner of performance the lowering of both desired values to zero is undertaken only when the exceeding has lasted a certain length of time, for which by the preferred embodiment, between the anti-valance circuit and the multivibrator there is connected a delay member (48) (e.g. delay line or network). With a preferred manner of operation the lowering of both desired values to zero is indicated optically and/or acoustically. With a preferred embodiment for this purpose an optical and/or acoustical indicator (52) is connected to the multivibrator (50).

Not only with unnormally strong control differences should the feeding of both components be interrupted by the two geared pumps, which do not need to be synchronized for feeding and dosing of two component lacquers as with a known dosing and mixing device according to Ransburg. An automatic adjusting of the feeding of both components is even desired with atomization of the mixed liquid by means of compressed air when the compressed air feed ends. Consequently with the preferred manner of performance it is provided that a drop of the pressure of the atomized air is detected and as a consequence of this the desired values for both controls are lowered to zero. Correspondingly the preferred embodiment is distinguished by an electrical switch (14) which is applied by pressure of the atomization air, which switch is connected to respectively each one input of the two AND circuits (30, 38). If on the other hand after an operating stop, again mixed fluid is to be atomized and for this purpose so-called preliminary air is provided, the two AND switches switch into conduction, whereupon the desired value estimates of both controllers are again achieved. With the preferred embodiment a pressure pick-up is provided as the measuring transducer. The analog voltage emitted by it is proportional to the flow of the main component. The preferred embodiment is distinguished finally in the manner that the electrical machines have disc armatures as rotors, which because of their small mass have a comparatively low moment of inertia, so that accelerations and delays or retardations of the rotation of the geared pumps take place very quickly.

BRIEF DESCRIPTION OF THE DRAWING

The invention is explained in particular on the basis of the preferred embodiment of the device in accordance with the invention which is illustrated by example by the drawing. The sole FIGURE of the drawing shows a block circuit diagram of the embodiment.

DESCRIPTION OF THE PREFERRED EMBODIMENT

A mixed liquid made of two liquid components is supposed to be produced, which components are mixed in any arbitrary preset or determinable proportion of quantities, for example a main (mother) lacquer and a hardener of a 2K-lacquer.

A pressure vessel $D_S$ in which a supply of mother lacquer is under gas pressure is connected via a line 2 with a mixing chamber V in which the mother lacquer and the hardener are mixed, which are fed in separately. A pressure vessel $D_H$ in which a supply of hardener is under gas pressure is connected via a line 4 with the mixing chamber V. A line 6 connects a source of compressed air L with an atomizer or sprayer Z in which the liquid mixture is produced in the mixing chamber V is atomized by means of compressed air.

In the mother lacquer line 2 and in the hardener line 4, respectively, there is disposed one doser 8 and 10, respectively. The mother lacquer - doser 8 and the hardener - doser 10 are the same in construction and each have a geared pump P which interrupts the line 2 and 4, respectively. In each dosing unit an electric machine M is provided as a drive or brake for the pump P. A generator voltage tachometer or tacho-generator T of the dosing unit is coupled with the machine M.

Between the doser 8 and the mixing chamber V the mother lacquer line 2 is provided with a pressure pick-up 12 as a measuring transducer. Similarly between the compressed air source L and the atomizer Z the compressed air line 6 is provided with a pneumatically actuatable electric switch 14.

A mother lacquer controller 16 and a hardener controller 18, respectively, is coordinated to the mother lacquer doser 8 and to the hardener doser 10. Both automatic controllers are electronic four-quadrant controllers which are constructed the same, which via, respectively, each one electrical line 20 and 22, respectively, emit a setting value to the associated electrical machine M and via a line 24 and 26, respectively receive a control signal value from the associated tacho-generator T.

The mother lacquer automatic controller 16 receives the desired value from the pressure pick-up 12 via a measuring amplifier 28 and an AND gate circuit 30. Moreover the output of the measuring amplifier 28 is connected with a first input of the AND circuit 30, the single output of which is connected to the desired value input of the controller 16.

The hardener controller 18 receives its desired value in the following manner: The control value which is received by the mother lacquer controller 16 is taken off from the line 24 as the actual value of the flow of the mother lacquer at a crossing point 32, and via an isolation amplifier 34 as an impedance transformer is fed for example to a 20-division digital potentiometer 36. The latter emits the desired value of the flow of the hardener to a first input of another AND circuit 38. This desired value is proportional to the control value for the control of the flow of the mother lacquer, the desired value corresponding to the fixed determined quantity proportion of the mother lacquer and the hardener. The output of the AND circuit 38 is connected with the desired value input of the hardener controller 18 so that the desired value arrives therein with an open gate 38.

The mother lacquer controller 16 and the lines 20 and 24 as well as the electrical machine M and the tacho-generator T of the mother lacquer doser 8 form a mother lacquer automatic control system with a desired value charge through the AND circuit 30. The hardener controller 18 and the lines 22 and 26 as well as the electrical machine M and the tacho-generator T of the hardener doser 10 exactly correspondingly form a hardener control circuit with desired value charge through AND circuit 38.

A comparator 40 and 42, respectively, is coordinated to each of the two control circuits, the comparators comparing the control magnitude, i.e., the actual value of the flow with its desired value. The actual value inputs of the two comparators 40 and 42 which are formed alike are connected with the crossing point 32, and respectively, with a branch point 44 of the line 26, while their desired value inputs are connected to the output of the measuring amplifier 28, and respectively, to the output potentiometer 36. Each comparator then produces an output signal when the control difference exceeds an adjustable maximum value. An anti-valence circuit, namely exclusive OR gate circuit 46 is connected to the two comparators 40 and 42, which OR circuit 46 emits an output signal to a delay member 48 of and as long as only one output signal of a comparator arrives thereat. If the control difference in one of the two automatic control systems lasts too long, then the delay member 48 transmits the output signal of the switch circuit 46 to a bi-stable multivibrator, namely a flip-flop circuit 50, which flip-flop 50 flips and thereby it continuously discharges thus an output signal to a control input of an optical indicator 52 having a light-emitting diode as well as, respectively, to a second input of the AND circuit 30 and 38, respectively. As a consequence of this the indicator 52 provides an alarm and the two AND circuits 30 and 38 are locked or prevented from passing the desire value to the controllers 16 and 18. By means of the manually actuatable resetter 54, the flip-flop circuit 50 is flipped back into its output - and steady - state, after the operating disturbance is eliminated.

Each of the two AND circuits 30 and 38 is provided with a third input as an additional control input. Both control inputs are connected with an electrical switch 14 and block the passage of the desired values to the controllers when the flow of the atomization air which is fed in the line 6 decreases, as is the case at the end of the atomization operation. Also the electrical machines M are then stopped, so that any feeding of mother lacquer and hardener suddenly stops. After turning of the preliminary air and placing the circuit 50 into operation, the desired values can be again fed to the controllers.

The manner of operation of the automatic control circuits or systems is commonly known. The manner of operation of the described embodiment as far as it is not already set forth above, is only further described insofar as it is necessary for explanation of the invention:

As soon as the device is operationally ready for the supply of the mixing chamber V and of the atomizer Z and preliminary air flows from the compressed air source L to the atomizer Z, the two AND circuits 30 and 38 are activated by the flip-flop circuit 50 and the electrical switch 14 in the compressed air line 6. However as long as the pressure pick-up 12 does not send a desired value since still no flow occurs in the mother lacquer line 2, both gear pumps P stand still and are stopped. If now however for example at a spraying gun having the mixing chamber V and the atomizer Z, the liquid valve which follows the mixing chamber V is opened, the gas pressure in the pressure vessel $D_S$ presses the mother lacquer through the line 2, whereby therein the pressure drops and the pressure pick-up 12 sends a first desired value to the mother lacquer controller 16, which desired value is continuously increased with increasing pressure drop. Now the control in the mother lacquer - automatic control circuit system 16-2-0-$M_8$-$T_8$—24-16 is utilized, in the manner that the control difference of the control value (actual value) from the increasing desired value is reduced continuously, for which purpose the electrical machine M is driven as a motor by the electronic four-quadrant controller 16 until the control value corresponds to the desired value which is attained. The tacho-generator T of the mother lacquer doser 8 supplies a first desired value very quickly at the start-up of the electromotor (order of magnitude: 10 ms).

As soon as a first actual value appears at the crossing point 32 of the electrical line 24 for the control value and the gas pressure in the pressure vessel $D_H$ presses hardener through the line 4, also in the hardener automatic control circuit 18-22—$M_{10}$-$T_{10}$—26-18, the electrical machine M of the hardener doser 10 is placed in motoric operation, so that the hardener is fed to the mixing chamber V in the desired quantity ratio relative to the mother lacquer. Furthermore, the automatic control circuit of the hardener behaves as the mother lacquer automatic control circuit.

If the outflow of the mixed liquid which is made from the mother lacquer and the hardener is throttled at the spraying gun, the pressure pick-up 12 reduces the desired value for the mother lacquer control, whereupon the desired value for controlling the hardener is proportionally reduced.

If the spraying operation is finished and no so-called after-treatment air is used for cleaning the liquid channels or is unnecessary, because an outside atomization occurs, then the closing of the valve for the atomization air causes a reduction of the flow in the compressed air line 6 and consequently a pneumatic actuation of the electric switch 14, which switch renders the two AND circuits 30 and 38 passive so that the two controllers 16 and 18 obtain the desired value zero. As a consequence of this the two electric machines M are immediately stopped, so that no excess pressure can build up in the lines 2 and 6.

If one or the other control is to be brought out of control, the flip-flop circuit 50, which is flipped by the comparators 40 and 42 as well as the exclusive OR circuit 46 with the delay member 48, makes the AND circuits 30 and 38 passive so that even then the electrical machines M are immediately stopped.

It is possible to complete the described embodiment for two liquid components of a mixed liquid such that three or more components are fed into the mixing chamber in a proper quantity ratio. For this purpose it is merely necessary to provide for each additional component an automatic control circuit corresponding to the hardener automatic control circuit, a potentiometer and an AND gate circuit with a desired value input and two control inputs as well as one comparator, and to increase the number of the inputs of the exclusive OR circuit 46 by 1. This is indicated by dashed lines in the drawing.

We claim:

1. In an apparatus for performance of a method for the automatic dynamic dosing at least of one liqiud component of a mixed liquid, particularly of a hardener of a 2 component-lacquer with mother lacquer, with which the flow of a pressure-transported main component is measured and the flow of a pressure-fed secondary component which is to be dosed is regulated and moreover adjusted corresponding to a predetermined ratio of the two components to be mixed, wherein the measured flow of the main component is used as a variable desired value of the nominal value of the main component for the control thereof and the flow of the main component is controlled such that a control value (actual value) thereof corresponds to the desired value, and controlling the flow of the secondary component by using the control value (the actual value) of the flow of the main component for determining the desired value of the flow of the secondary component in the predetermined ratio to this control value, and having one pressure vessel containing the main component and one pressure vessel containing the secondary component, an analog measuring transducer which produces an electrical value proportional to the actual flow of the main component, a first servo controlled system including a first geared pump for feeding the secondary component in the first servo controlled system, a first electrical machine which is operatable as a motor and drives the first geared pump, the geared pump forming a first regulating element with the first electrical machine, a first electronic four-quadrant controller for the first electrical machine and a digital potentiometer for adjusting to the predetermined ratio the quantities of the secondary component relative to the main component, the improvement further comprising a second servo controlled system for the main component, including a geared pump means for feeding the main component in the second servo controlled system, said geared pump means being arranged between the pressure vessel containing the main component and said measuring transducer, the latter also constituting a part of the second servo controlled system, a second electrical machine which is operatable as a motor and constitutes means for driving said geared pump means for the main component, said geared pump means with the second machine associated therewith forms a second regulating element, and a second electronic four-quadrant controller operatively connected to said second electrical machine associated with the main component and with said measuring transducer, and two tacho-generators are coupled with respectively each said first and second electrical machines and said first and second electronic four-quadrant controllers and constitute parts of said first and second servo controlled systems, said digital potentiometer is connected to an electrical connection line in said second servo controlled system between one of said tacho-generators and said second electronic four-quadrant controller, said first electronic four-quadrant controller being also connected to said first electrical machine and connected to said digital potentiometer.

2. The apparatus according to claim 1, wherein said measuring transducer is a pressure pick-up.

3. The apparatus according to claim 1 or 2, wherein said electrical machines have disc armatures as rotors.

4. The apparatus according to claim 1, including an electrical arrangement means connecting the measuring transducer to said second electronic four-quadrant controller, and said first electrical machine for the secondary component as well as the first electronic four-quadrant controller for the secondary component are arranged in a first electric automatic control circuit constituting said first servo controlled system, a second electric automatic control system constitutes the second servo controlled system including said second electric machine and said one of said tacho-generators, said second electrical machine for the main component and said second electronic four-quadrant controller therefor are arranged in said second automatic control system.

5. The apparatus according to claim 4, further comprising an isolation amplifier connected between said one tachogenerator for the main component and the potentiometer.

6. The apparatus according the claim 4, further comprising an impedance transformer connected between said one tacho-generator for the main component and the potentiometer.

7. The apparatus according to claim 4, wherein said electrical arrangement means includes a measuring amplifier connected between said measuring transducer and said second electronic four-quadrant controller.

8. The apparatus according to claim 7, further comprising two AND circuits, one of the latter constituting a part of said electrical arrangement means, two comparators each having a desired value input, an actual value input and an output, said measuring transducer and said measuring amplifier, respectively, and the potentiometer are connected via respectively each one of said AND circuits to the second and first electronic four-quadrant controller for the main component and secondary component, respectively, and directly respectively each to the desired value input on one of said comparators, for operatively sending respective of the desired values thereto, the actual value inputs of said comparators are connected with said tacho-generators for the main component and secondary component, respectively, an anti-valence circuit is connected to said outputs of said two comparators, a bi-stable multivibrator is operatively connected to and controlled by said anti-valence circuit, said multivibrator has an output connected to respectively each one input of said two AND circuits.

9. Apparatus according to claim 8, further comprising an exclusive OR-gate constitutes said anti-valance circuit, and said multivibrator constitutes a flip-flop circuit with a manually releasable resetting means.

10. The apparatus according to claim 8, further comprising a delay member connected between said anti-valence circuit and said multivibrator.

11. The apparatus according to claim 8, further comprising an optical indicator connected to said multivibrator.

12. The apparatus according to claim 8, further comprising an acoustical indicator connected to said multivibrator.

13. The apparatus according to claim 8, further comprising an electric switch means for being applied by pressure of the atomization air, said electric switch means is connected to each one input of said two AND circuits.

* * * * *